United States Patent [19]

Collins, III

[11] 4,180,961

[45] Jan. 1, 1980

[54] INDUCTION HEAT SEALED CONTAINERS

[75] Inventor: John W. Collins, III, Allegheny Township, Westmoreland County, Pa.

[73] Assignee: Aluminum Company of America, Pittsburgh, Pa.

[21] Appl. No.: 903,721

[22] Filed: May 8, 1978

Related U.S. Application Data

[62] Division of Ser. No. 748,694, Dec. 8, 1976, Pat. No. 4,109,815.

[51] Int. Cl.² .......................... B67B 3/00; B65B 7/28
[52] U.S. Cl. ............................... 53/421; 53/478; 53/488
[58] Field of Search ................. 53/421, 478, 488, 373, 53/442; 156/69; 215/231, 232, 10, 347, 277, 341

[56] References Cited

U.S. PATENT DOCUMENTS

| | | | |
|---|---|---|---|
| 2,620,938 | 12/1952 | Jesnig | 215/231 |
| 2,620,939 | 12/1952 | Weisgerber | 156/69 |
| 2,937,481 | 5/1960 | Palmer | 215/347 |
| 3,460,310 | 8/1969 | Adcock | 215/232 |
| 3,460,701 | 8/1969 | Powalowski | 215/10 |
| 3,504,817 | 4/1970 | Heider | 53/442 X |
| 3,632,004 | 1/1972 | Grimes | 215/277 |
| 3,767,076 | 10/1973 | Kennedy | 215/232 |
| 3,815,314 | 6/1974 | Pollock | 53/478 |
| 3,928,109 | 12/1975 | Pollock | 215/341 |

*Primary Examiner*—Horace M. Culver
*Attorney, Agent, or Firm*—David J. Hill; David W. Brownlee

[57] ABSTRACT

A method of sealing containers is disclosed in which a glass jar having a small upwardly convex bead on its rim is filled and sealed using a metal foil membrane with a heat seal resin on its undersurface and a plastic snap cap having a material thickness over the bead on the jar of at least twice the height of the bead. The foil membrane is induction heated while high unit pressure is applied against the top of the snap cap to impress the bead on the jar and foil membrane into the plastic of the cap to form the foil membrane over the convex surface on the bead and seal the membrane to the jar.

1 Claim, 4 Drawing Figures

INDUCTION HEAT SEALED CONTAINERS

Cross Reference to Related Applications

This is a division of application Ser. No. 748,694, filed Dec. 8, 1976 and now U.S. Pat. No. 4,109,815.

Background of the Invention

1. Field of Art

This invention relates to sealed containers and to a method of sealing a glass container by induction heating a foil membrane and adhesive resin thereon to seal the membrane to a raised bead on the mouth of the container.

2. Brief Description of the Prior Art

Induction heat sealing of metal foil membranes on plastic containers is well known as for example is disclosed in U.S. Pat. Nos. 2,937,481; 3,632,004; 3,767,076 and 3,815,314, among others. The metal foil membrane typically has a heat seal resin of thermoplastic material thereon which is sealed to the plastic container under heat and pressure. Pressure applied against the top of an overcap presses the foil membrane against a sealing surface on the container to form a continuous seal around the container mouth. Plastic containers are sufficiently flexible to compensate for irregularities in the sealing surfaces and non-parallelism between the sealing surface and the base of the container. Melting the plastic in the container to fuse it to the diaphragm as in U.S. Pat. Nos. 2,937,481 and 3,632,004 also increases the area of contact under pressure to further compensate for irregularities in the sealing surface on plastic containers.

It is also known to induction heat seal metal foil membranes on glass containers as is for example disclosed in United States Adcock et al U.S. Pat. No. 3,460,310. However, glass containers typically have irregularities in their dimensions which make it difficult to get a continuous seal around a container mouth. Localized dips on the sealing surface of wide mouth glass containers and non-parallelism between the top surface and the base of the glass containers have prevented the adoption of low-cost closure systems on glass containers. A prime example of a low-cost closure system is a plastic snap cap with a coated or laminated foil/adhesive liner or membrane which can be hermetically sealed to the mouth of a container with known high speed induction heat sealing techinques.

It is also known to provide a small upwardly projecting bead on a bottle mouth to improve sealing characteristics as is disclosed in U.S. Pat. Nos. 1,077,538; 2,109,805; 2,403,511 and 2,620,938.

A system is desired for high speed induction heat sealing of glass containers using low-cost closures.

Summary of the Invention

This invention provides a sealed container and method in which a glass jar having a continuous raised bead on the mouth thereof is sealed with a metal foil membrane having a heat seal resin on its undersurface. A plastic snap cap is positioned on the bottle mouth over the metal foil membrane and high unit pressure is applied against the top of the snap cap while the foil membrane is induction heated. The pressure against the top of the cap impresses the container bead into the plastic material of the cap to form the foil membrane over the bead between the bead and the plastic snap cap. The heat from the membrane activates the heat seal resin on the membrane and softens the plastic snap cap to facilitate impresing the container bead into the snap cap to form the continuous seal around the container mouth. The raised bead on the container is relatively small to facilitate producing a high unit pressure between the surface thereof and the plastic snap cap to thereby impress the bead into the plastic and form the metal foil liner over such bead. The metal foil membrane is preferably a laminate of materials which are judiciously selected to be flexible enough to be formed over the bead by the pressure of the snap cap thereagainst.

Accordingly, an object of this invention is to provide an improved system for sealing glass containers.

Another object of this invention is to provide a technique for applying low-cost closures comprising a plastic snap cap and coated metal foil membrane on glass containers using high speed induction sealing techniques.

A further object of this invention is to provide a glass jar having a small raised bead on the rim thereof defining the container mouth to facilitate sealing the jar with a metal foil membrane and a plastic snap cap thereover.

It follows that an advantage of this invention is in making possible high speed induction heat sealing of glass jars in which irregularities in the glass surfaces do not interfere with providing a continuous seal around the mouth of the jar.

The above and other objects and advantages of this invention will be more fully understood and appreciated with reference to the following description and the drawings attached hereto.

DESCRIPTION OF A PREFERRED EMBODIMENT

Figure 2:
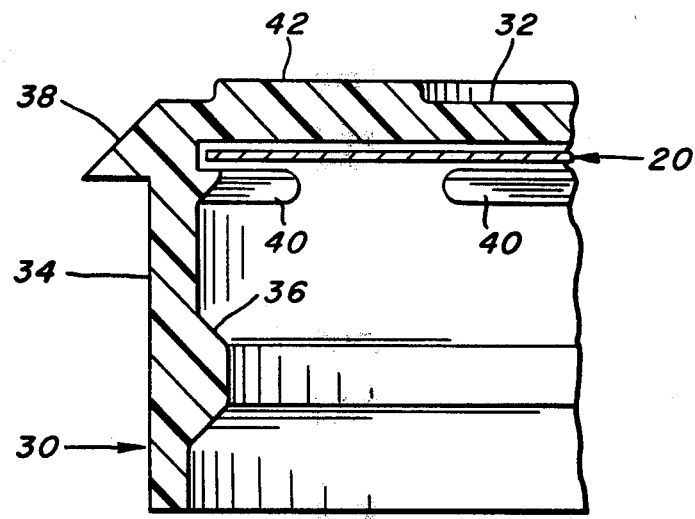
FIG. 2 is a fragmentary cross-sectional view through a metal foil membrane and plastic snap cap for sealing the container of FIG. 1.
Figure 1:
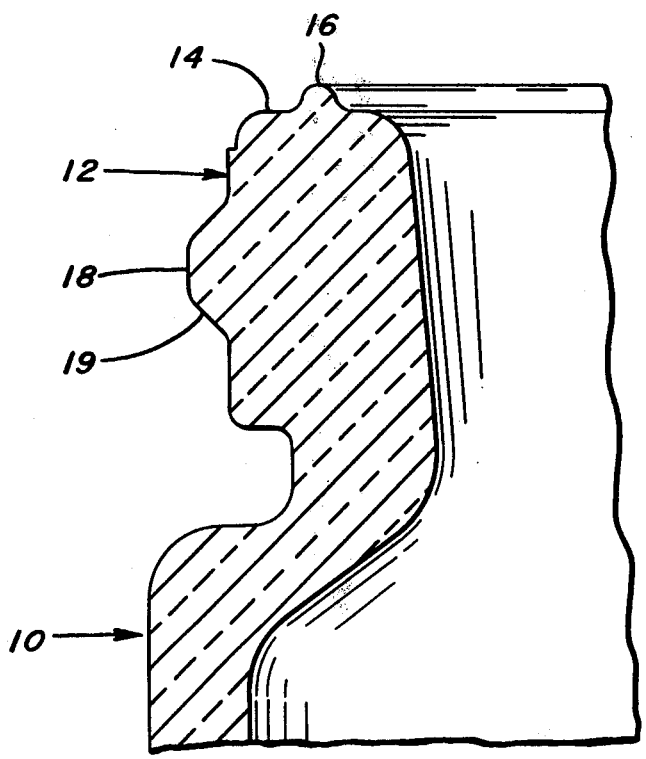
FIG. 1 is a fragmentary cross-sectional view through a glass container for this invention.

Referring to the drawings, a glass jar 10 is provided which is adapted to be induction heat sealed using a low-cost metal foil membrane 20 with a plastic snap cap 30 thereover. Heretofore, induction heat sealing of glass containers has been commercially unreliable because glass containers have dimensional tolerances which result in uneven sealing surfaces. For example, the sealing surfaces on glass containers may have dips therein of 0.020 inch or more, and may be as much as 0.030 inch out-of-parallel between the top sealing surface and the supported surface of the container. This means there will be uneven contact of the membrane against the container when sealing and pressure is applied against a closure on the container. Such uneven contact frequently results in a poor seal between the membrane and the container mouth. Consequently, successful heat sealing glass containers by pressure application of a foil membrane has heretofore been difficult, if not impossible, at production speeds.

To overcome the prior art sealing problems, the mouth 12 of jar 10 has a top surface 14 with a small upwardly projecting convex bead 16 thereon extending continuously around the container mouth. The bead 16 projects upwardly above the flat surface 14 on the container far enough to compensate for irregularities in the glass dimensions, and is relatively small to result in high pressure per unit area between the bead and the overlying foil membrane and snap cap during sealing.

The height of the bead is particularly selected in consideration of the expected variances in the glass dimensions. The Glass Container Manufacturers Institute (GCMI) sets a standard tolerance for an 83 millimeter container of 0.050 inch in the height of the two surface of the container (see Handbook of Package Engineering 1971). However, a sampling of 83 millimeter glass containers revealed that the maximum variance in the top sealing surface is more typically about 0.020 inch. Accordingly, to compensate for such typical variances, the bead 16 on an 83 millimeter container for this invention may be in a range of approximately 0.020 to 0.025 inch high so the bead will support the pressure of the foil membrane and snap can completely around the container mouth before the pressure load is applied against the container surface 14 adjacent the bead on the high side of the container. If the bead is too low, the flat surface 14 on the high side of the bottle will support the sealing load, and inadequate sealing pressure may be applied against the bead on the low side of the container.

The bead 16 must not be too high, however, because a high bead may completely penetrate the plastic snap cap during sealing and may be vulnerable to chipping or breaking. The bead should therefore have a height approximately equal to the maximum allowable variation in height of the top surface of the bottle.

The minimum width of the bead 16 is determined by glass strength. To minimize chipping of the glass, the bead should be at least as wide as it is high and preferably about 1½ times wider than it is high. The bead further has an upwardly convex or rounded top to facilitate molding and avoid chipping. In an exemplary 83 millimeter container, the bead 16 may be approximately 0.30 inch wide and 0.020 inch to 0.025 inch high with a 1/64 inch radius for the upwardly convex surface of the bead.

The mouth 12 of the container further includes a locking bead 18 which presents an outwardly projecting shoulder 19 for securing a plastic snap cap on the container.

Figure 4:
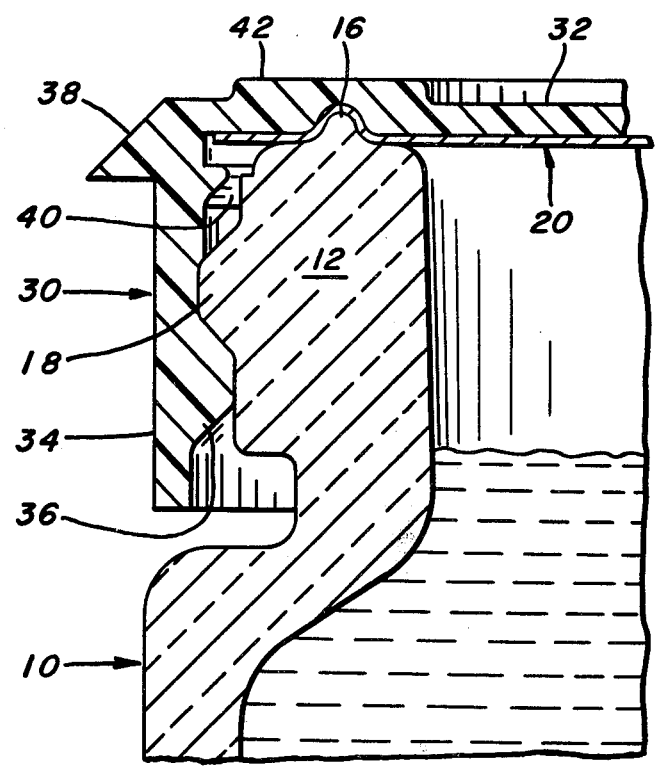
FIG. 4 shows a glass container having a metal foil membrane induction heat sealed thereto in accordance with this invention.

FIG. 2 shows a plastic snap cap 30 with a metal foil membrane 20 in it which is adapted to be sealed on the container mouth 12. The snap cap 30 may be made of plastic such as polypropylene or polyethylene which is heat and pressure-deformable. The cap comprises a top end wall 32 and a depending skirt 34 around the top wall. The skirt 34 includes an inwardly projecting lip 36 for engagement under the locking shoulder 19 on the container 10 to secure the snap cap on the container. An outwardly projecting lip 38 may also be provided near the top of the outer surface of the skirt to facilitate lifting the snap cap for removal from the container. The skirt 34 is preferably long enough to extend below the fill height of the container to be sealed as shown in FIG. 4 so the container will not appear to be underfilled. The foil membrane 20 may be retained in the cap 30 by a small rib or ribs 40 around the inner surface of the cap adjacent the top wall 32.

The foil membrane 20 may comprise aluminum foil with only a heat seal resin on it, but usually comprises a laminate of paper, adhesive, aluminum foil and heat seal resin. The paper preferably has a release coating, such as nitrocellulose, on the surface thereof against the overcap to prevent adhesion to the overcap. In some laminates a separate barrier coat may also be provided on the undersurface of the foil to protect it against the contents of a container.

A membrane 20 is judiciously selected to satisfy three requirements (1) sufficient rigidity to be die cut, inserted into the snap cap and remain there during shipping, handling and application; (2) proper heat transfer characteristics which will effect softening of snap cap to conform to the bead on the container without melting the snap cap and effect activation of the heat seal resin without overheating it; and (3) sufficiently flexible to be formed over the bead on the container under the sealing pressure.

In heat sealing a membrane on a container, the heat which is induced in the foil layer is simultaneously transferred up to heat the plastic snap cap and transferred down to activate the heat seal resin. Improper selection of materials and/or sealing temperatures will result in poorly sealed containers. If the sealing temperature is too low, the resin will not stick. If the sealing temperature is too high, the seal can be blown off by internal pressure in the container before the resin cools to its hot tack temperature.

Use of a paper layer in the membrane 20 helps provide stiffness to facilitate die cutting, etc. while also providing insulation between the foil layer and plastic snap cap to permit use of a wide variety of heat seal coatings having sealing temperatures which exceed the distortion temperature or melting point of the plastic snap cap. With membranes which do not include such an insulating layer, a heat seal resin must be selected which has an activation temperature below the distortion temperature of the plastic snap cap. If the snap cap is heated above its distortion temperature, the plastic material of the cap will flow under the effect of top pressure applied thereagainst during sealing and will not effectively transfer such pressure to the foil membrane to seal it against the container bead.

Some exemplary membranes for this invention include the following: nitrocellulose (NC)/25 pound paper/0.001 inch polyethylene adhesive/0.0015 aluminum foil/0.0005 polyethylene/6 pounds per ream heat seal resin; NC/47 pound paper/casine neoprene adhesive/0.0015 inch aluminum foil/6 pounds per ream heat seal resin; and NC/0.002 inch aluminum foil/6 pounds per ream heat seal resin, among others. In the above examples, the paper weights are given in pounds per 3,000 square foot ream. The heat seal resins include ethylene-vinyl acetate resin (activation temperature 200°–250° F.) and ethylene-acrylic acid copolymer resin (activation temperature of 275°–325° F.), among others. The activation temperatures can be modified (lowered) by adding wax to such resins.

In accordance with this invention, the snap cap 30 has a material thickness in the top wall 32 at the location overlying the bead 16 on the container which is at least twice the height of the bead. Such material thickness is required to permit the bead 16 to be impressed into the plastic material and thereby form the foil membrane 22 over such bead without penetrating completely through such wall. In a preferred embodiment of this invention, the snap cap includes a raised rim 42 in the top wall 32 continuously around such top wall concentric with and overlying the bead 16 on the container. This rim acts as a stacking ring as it is typical of most plastic snap caps, and also provides the requisite material thickness in the snap cap overlying the bead. The provision of such a rim conserves on plastic material by providing the requisite material thickness only in the area of the underlying bead 16 on the container instead of across the entire top wall. The diameter and lateral extent of the rim 42 preferably approximately corresponds with the diameter and lateral extent of the top surface 14 of the container 10 so the rim will overlie such top surface when the overcap is positioned on the container.

In the practice of this invention, the foil membrane 20 is preferably die cut and inserted into the snap cap 30 preparatory to positioning of the foil membrane and snap cap on a filled container. The ribs 40 in the snap cap retain the foil membrane in the snap cap during handling and positioning of the snap cap and membrane on a filled container.

Figure 3:
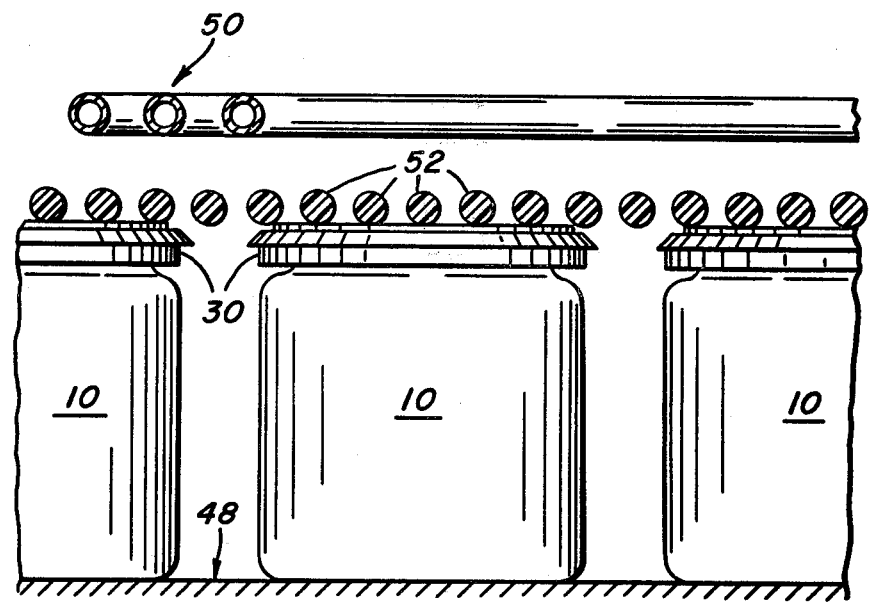
FIG. 3 shows containers and closures of the type illustrated in FIGS. 1 and 2 during sealing thereof by means of an induction heating coil and pressure-applying rollers.

FIG. 3 illustrates a system for induction heat sealing of containers 10 with foil membranes in plastic snap caps 30. The filled containers 10 with membranes and snap caps 30 thereon are supported on a table 48 and moved under an induction heating coil 50 which heats the foil membrane in each cap to seal the membrane on its container. U.S. application Ser. No. 570,486, filed Apr. 22, 1975, discloses a preferred induction heating coil for use in this system.

A plurality of rollers 52 press against the top wall of each closure against its container as the container and closure are moved under the induction heating coil 50. Small nonmagnetic rollers 52 are preferably employed to produce the high localized pressure required to deform the plastic snap cap against the raised bead on the container mouth. The rollers 52 are preferably made of fiberglass and may be approximately ½ inch in diameter.

Using the aforesaid system, hundreds of containers can be sealed per minute using an inexpensive foil membrane and plastic snap cap. The line speed is determined by the speed at which the containers can be filled and a snap cap positioned thereon. As the containers are moved under the coil 50, heat is quickly induced in the foil membrane by the coil to activate the seal resin on the undersurface of the cap and seal the foil membrane against the raised rib on the container mouth. The heat also softens the plastic in the snap cap 30 so the pressure applied against the top of the cap will form the plastic material of the cap over and around the bead 16 on the container. Forming of the plastic material of the snap cap 30 over the bead 16 also forms the foil membrane against such bead to provide a continuous seal between the membrane and bead regardless of commercially accepted irregularities in the dimensions of the container.

FIG. 4 is a fragmentary cross section through a glass jar 10 sealed with a foil membrane 20 with a plastic snap cap 30 thereover. As seen in that figure, the metal foil membrane 20 is formed over the bead 16 on the container 10 and the bead and membrane are impressed into the plastic material of the snap cap 30. The flat surface area on opposite sides of the bead 16 may provide a secondary area of sealing of the foil membrane to the container mouth, but such secondary sealing is not necessary for a continuous seal around the container mouth.

To open a container sealed in accordance with this invention, the snap cap may be removed by lifting it to expose the container mouth with the foil membrane sealed thereover. The foil membrane preferably extends radially outwardly beyond the rim of the container to present a peripheral edge which can be gripped with the fingers. The membrane can be removed by peeling it from the container. In so stripping the membrane from the container, part of the heat seal resin will remain on the container bead since the adhesion between the container and the resin is at least as secure as is the adhesion between the resin and the foil membrane. However, such residual of resin on the container does not contaminate the container mouth or the contents of the container as the residue is securely adhered to the container. The resin is also preferably transparent so a residue of resin on the container mouth is not unattractive to the consumer.

It is therefore seen that this invention provides an improved system for sealing glass containers with relatively inexpensive closures using high speed induction sealing techniques. The metal foil membrane which is employed in such sealing is secured to the container mouth continuously around the mouth to prevent leakage of the container contents and ingress of oxygen or other contaminants into the container. The plastic snap cap and foil membrane are adapted to be easily removed from the container to gain access to the contents of the container. After the foil membrane has been removed from the container, the plastic snap cap may be used as a reclosure for the container.

Although a preferred embodiment of this invention has been illustrated and described, it will be appreciated by those skilled in the art that numerous modifications can be made in the invention without departing therefrom or from the scope of the claims appended hereto.

What is claimed is:

1. A method of sealing a container comprising providing a glass jar having a mouth with an upwardly facing surface and a continuous raised bead thereon with a narrow, upwardly convex cross-sectional configuration, filling said container, positioning a metal foil membrane with a heat seal resin on its undersurface across said container mouth and a heat and pressure-deformable plastic snap cap on the container mouth over said foil membrane, said snap cap having a material thickness over said bead of at least twice the height of the bead, and induction heating said foil membrane to heat the resin thereon and portions of said snap cap overlying said bead while applying high unit pressure against the top of said snap cap to impress said bead and the foil membrane into the plastic of said cap to form said foil membrane over the upwardly convex surface of said bead and seal the membrane to the jar continuously around the mouth thereof despite irregularities in the glass dimensions within commercially acceptable tolerances.

* * * * *